(12) United States Patent
Fang

(10) Patent No.: US 10,186,890 B2
(45) Date of Patent: Jan. 22, 2019

(54) SYSTEM AND METHOD FOR BATTERY CHARGING

(71) Applicant: Huazhen Fang, Lawrence, KS (US)

(72) Inventor: Huazhen Fang, Lawrence, KS (US)

( * ) Notice: Subject to any disclaimer, the term of this patent is extended or adjusted under 35 U.S.C. 154(b) by 239 days.

(21) Appl. No.: 15/184,045

(22) Filed: Jun. 16, 2016

(65) Prior Publication Data

US 2016/0372937 A1 Dec. 22, 2016

Related U.S. Application Data

(60) Provisional application No. 62/180,498, filed on Jun. 16, 2015.

(51) Int. Cl.
*H02J 7/00* (2006.01)

(52) U.S. Cl.
CPC .......... *H02J 7/0075* (2013.01); *H02J 7/0077* (2013.01); *H02J 2007/0096* (2013.01); *Y02B 40/90* (2013.01)

(58) Field of Classification Search
CPC .............................. H02J 7/0077; H02J 7/0075
USPC ....................................................... 320/132
See application file for complete search history.

(56) References Cited

U.S. PATENT DOCUMENTS

| 9,461,492 | B1* | 10/2016 | Berkowitz | ............ H02J 7/0052 |
| 2007/0159137 | A1* | 7/2007 | Verbrugge | ........... G01R 31/361 |
| | | | | 320/132 |
| 2011/0313603 | A1* | 12/2011 | Laberteaux | ........... B60L 11/184 |
| | | | | 701/22 |

* cited by examiner

*Primary Examiner* — Edward Tso
*Assistant Examiner* — Ahmed Omar
(74) *Attorney, Agent, or Firm* — Law Office of Mark Brown, LLC; Christopher M. DeBacker

(57) ABSTRACT

A battery charging system and method that take different sources of information regarding the battery status and user needs, assesses the charging objectives and the battery state, derives the charging decisions, and then charges the battery accordingly. A controller interprets the information and, in connection with inputs from user, determines an optimal charging application for the battery. The battery charging system and methods operate in a either real-time or approximately real-time fashion. It can collect the data information, makes the charging decisions based on rules, principles, algorithms and computation, and implements the decisions. It can also be triggered by time or event related with the battery status.

15 Claims, 5 Drawing Sheets

SYSTEM AND METHOD FOR BATTERY CHARGING

CROSS-REFERENCE TO RELATED APPLICATION

This application claims priority in U.S. Provisional Patent Application No. 62/180,498, filed Jun. 16, 2015, which is incorporated herein by reference.

BACKGROUND OF THE INVENTION

1. Field of the Invention

The present invention relates generally to energy storage systems and methods for use thereof, and more specifically to health-aware control-based rechargeable batteries.

2. Description of the Related Art

As a highly desirable choice for energy storage, rechargeable batteries have an irreplaceable role in consumer electronic devices, electric/hybrid vehicles, renewable energy generation, smart grid and many other areas. For a battery, the charging process is fundamental to its performance, safety and longevity, and for the user, a primary factor that his/her satisfaction rests on. However, the existing systems and methods are hardly able to fulfill the expectations of charging a battery efficiently to near full capacity and with minimized harm to health. The pressing need for high-performance charging strategies has thus remained to date.

Popular charging methods in industrial practice, especially for inexpensive lead-acid batteries used for cars and backup power systems, are to apply a constant voltage or force a constant current flow through the battery. Such methods, though easy to implement, can lead to serious detrimental effects for the battery. One improvement is the constant-current/constant-voltage, which forces a constant current into the battery at first and then decreases the magnitude of current after a voltage threshold is reached. Charging using current pulses has attracted some attention in recent years, due to the benefits of improving charge acceptance, shortening charge duration and promoting life expectancy.

Such methods, however, suffer from limitations. First, their design, considering only current, voltage and state-of-charge, fails to take into account other significant information, e.g., state-of-health, constraint on charge time, and temperature. Second, they lack effective mechanisms to integrate the information sources and transform them into the best or most plausible decisions about charging. As an example, a pulse charger in its present form governs the charging process using at most some empirical rules, rather than adjusts the charging current dynamically, optimally on the ground of all available information. Therefore, an information-aware, feedback-control-based charging system is needed, with abilities to meet the user-specified time constraint, enhance the battery's performance and extend its life expectancy. Third, these methods exclude the user from the charging process. The user is not allowed to present their charging objectives based on the immediate situation or needs. This will cause inconvenience and even less satisfaction on the user's side Heretofore there has not been available a system or method for rechargeable battery power storage systems with the advantages and features of the present invention.

BRIEF SUMMARY OF THE INVENTION

The present invention provides a battery charging system and methods that take different sources of information regarding the battery status and user needs, assesses the charging objectives and the battery state, derives the charging decisions, and then charges the battery accordingly.

The battery charging system and methods operate in a either real-time or approximately real-time fashion. It can collect the data information, make the charging decisions based on rules, principles, algorithms and computation, and implement the decisions. It can also be triggered by time or events related to the battery status.

The battery charging system has an interface to interact with the user, receiving and relaying user commands to the controller unit for decision-making of the charging current profile.

The battery charging system can be used to charge various types of batteries, including but not limited to lithium-ion, lead-acid, nickel-metal hydride and sodium batteries.

The present invention provides a battery charging system that takes multiple information sources into account when charging, including but not limited to the state-of-charge, state-of-health, actual maximum capacity, present number of cycles, user-specified charging objectives.

The present invention provides a battery charging system that builds on feedback control and optimization. It receives the user commands and dynamic feedback information about battery state, compares the current charging status with the objective, and then generates decisions and actions to adjust the charging current according to optimization-based or rule-based mechanisms. It closes the loop of the battery, controller unit and charging unit and thus gains more intelligence.

For this battery charging system, a controller unit dictates the charging current profile. Specifically, the amplitude of the charging current will be adjusted dynamically and optimally to maximize the charge acceptance, minimize harmful effects on health and meet the user-specified expectation

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Battery Charging System 2

Figure 1:
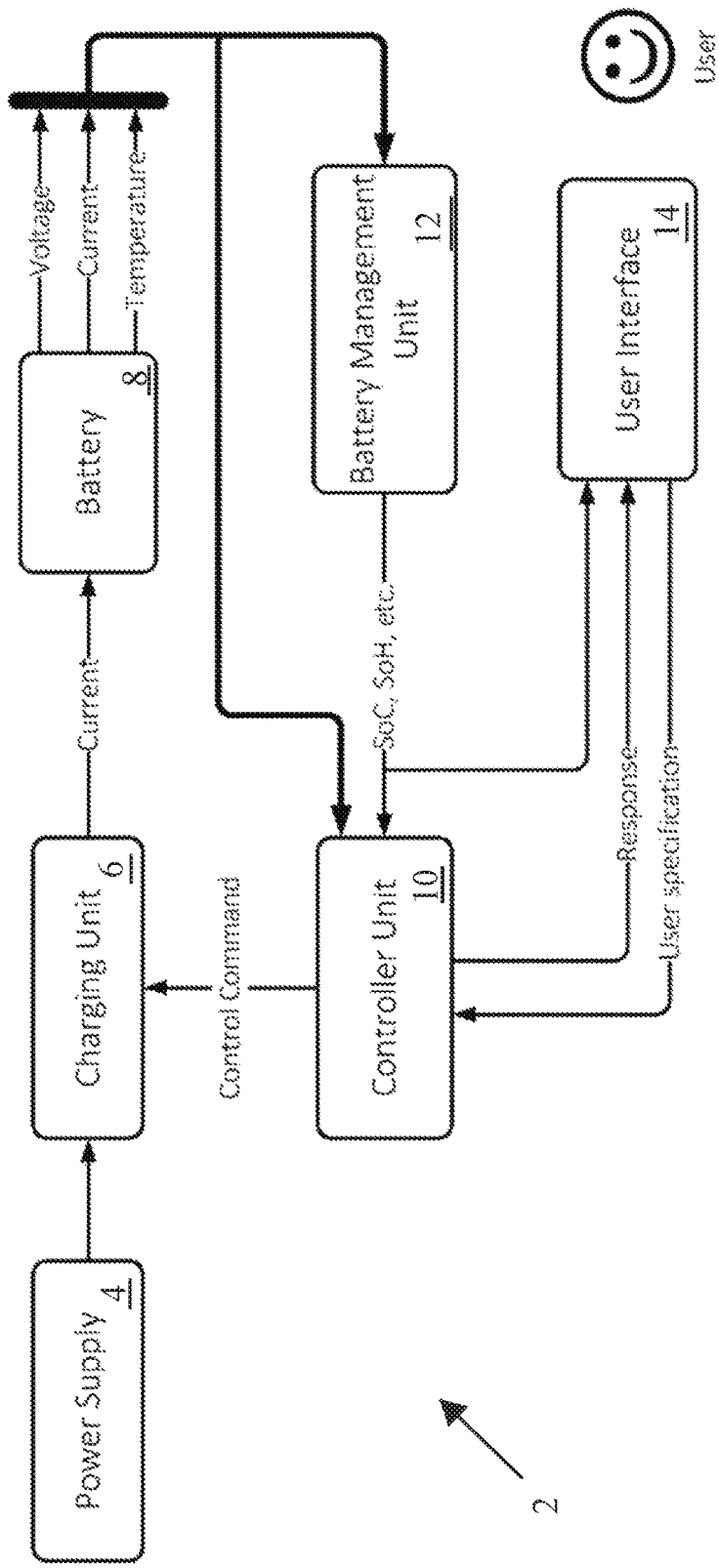
FIG. 1 is a block diagram of a preferred embodiment of the present invention.

FIG. 1 is a schematic description of the battery charging system 2 for charging a battery 8 with a power supply 4. Rather than a traditional open-loop charger, it includes a battery management unit 12, a controller unit 10 and a charging unit 6, where the present invention closes the feedback loop between those elements. Different from other chargers, this system has a user interface 14, through which the controller unit 10 interacts with the user. It can receive the user's commands on expected charge time and target charge value, evaluate the feasibility and return the results to the interface for appropriate display to the user. The controller optimally includes a CPU and some data storage, which may be a typical computerized storage device. The user interface may include a touch screen display, keyboard, mouse, or other typical computerized interface. The battery can be any typical battery type, including but not limited to a lithium-ion battery, a nickel metal hydride battery, a lead-acid battery, or a sodium-ion battery To fulfill the charging task, the controller unit 10 gathers information from multiple sources, either external to the control unit or internal if the control unit includes the capabilities for measuring those variables. Running in collaboration with the battery management unit 12, it takes information regarding the battery status, including state-of-charge ("SoC"), state-of-health ("SoH"), capacity, and internal resistance. It also collects data information such as voltage, current and temperature.

Figure 2:
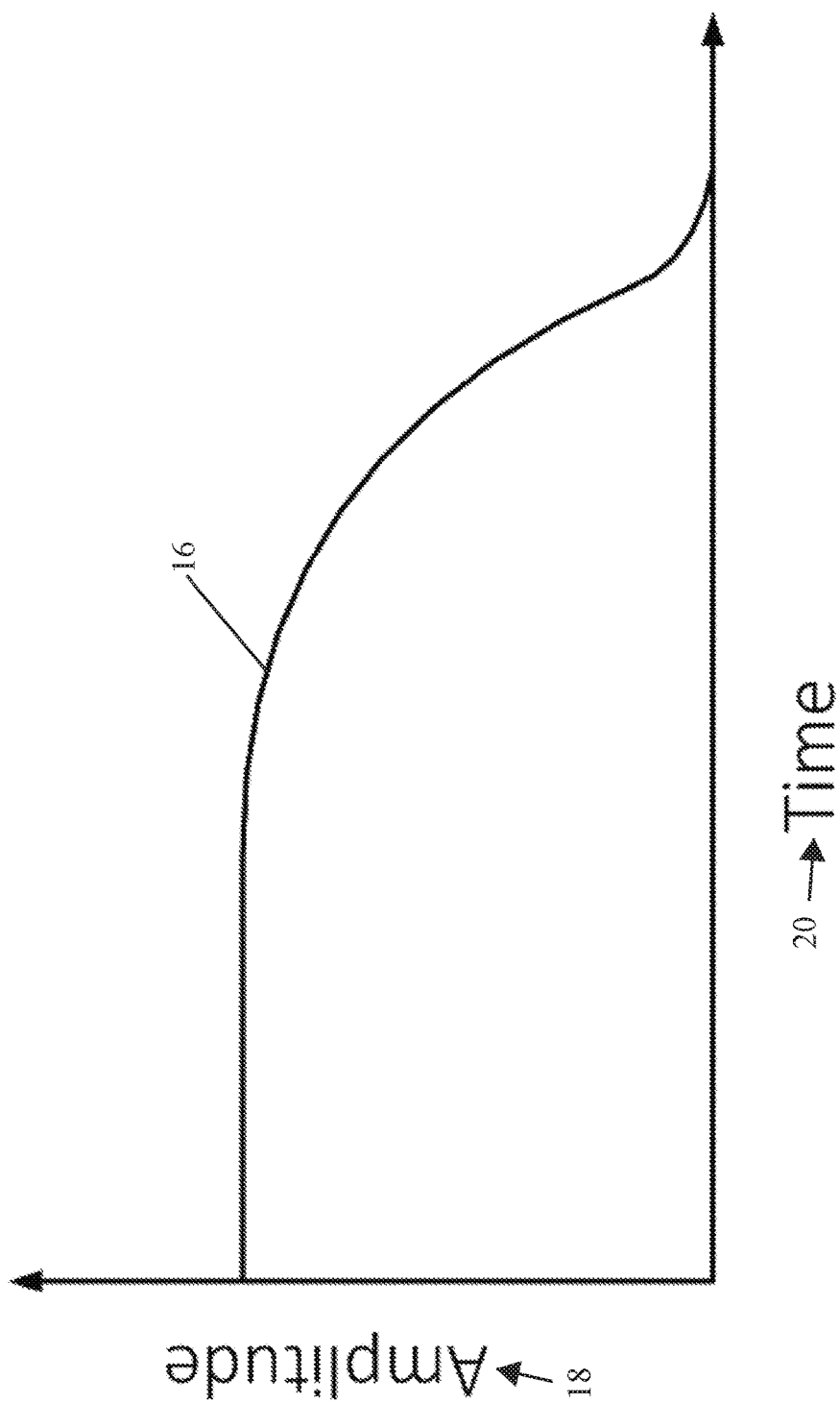
FIG. 2 is a schematic illustration of a typical charging current profile of a battery.
Figure 3:
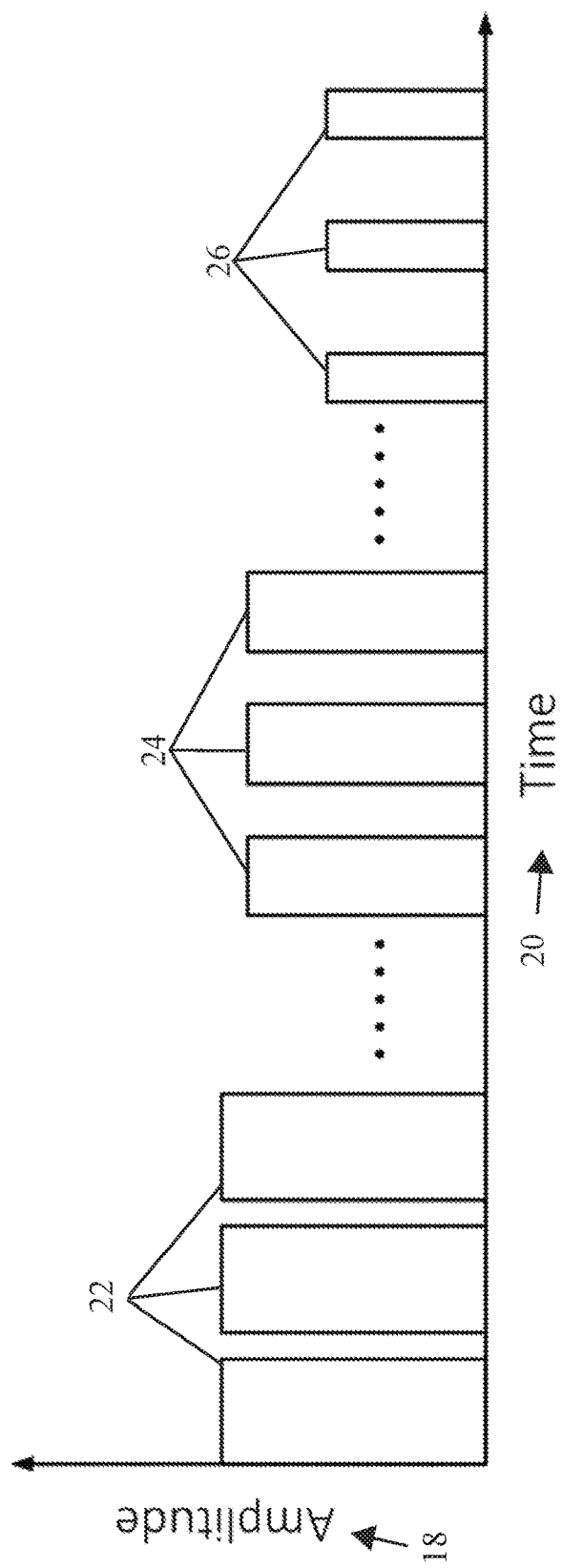
FIG. 3 is another schematic illustration thereof.

Generation of the control command is performed in real time or may be triggered by event. The controller 10 can be built upon optimization-based or rule-based methods. A wide variety of options can be chosen and applied, e.g., optimal control, adaptive control, fuzzy control, and model predictive control. The control command tunes or adjusts the current profile. The illustration of example charging current profiles for an empty battery is presented in FIGS. 2 and 3. In FIG. 2, an approximately constant charging current 16 is applied over time 20, and then the amplitude 18 is reduced as charging progresses. In FIG. 3, large and wide current pulses 22 are forced through the battery to pump energy into it in the initial stage. When the state-of-charge achieves a certain value or other conditions are satisfied, the pulses decrease in magnitude and width as indicated by the second set of pulses 24. Pulses are modulated to have smaller magnitude and width when the battery approaches the full capacity such as indicated by the third set of pulses 26. The control-based regulation will remarkably increase the charge acceptance, achieve high capacity, reduce heating and gassing and prolong battery life.

Figure 4:
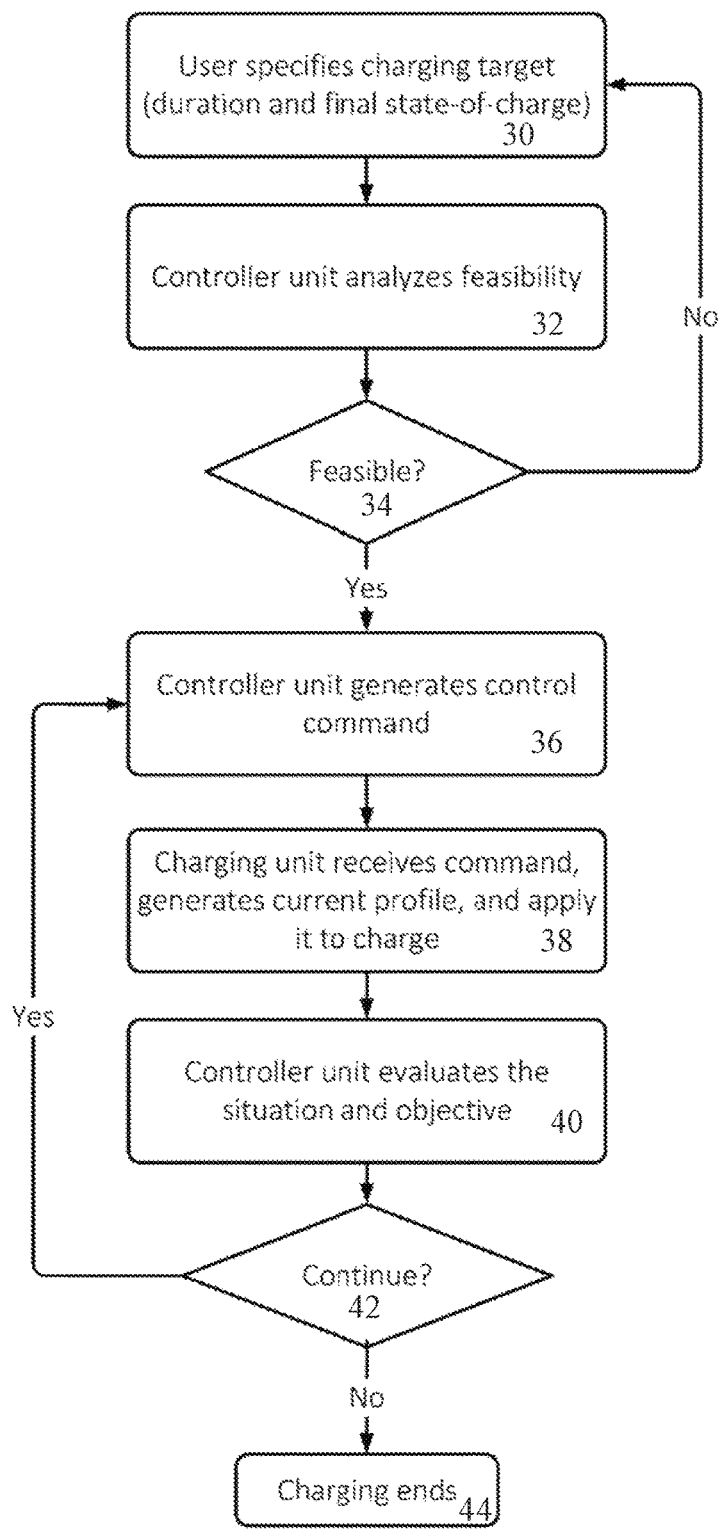
FIG. 4 is a flow chart demonstrating the steps taken by an operational mechanism of a preferred embodiment of the present invention.

FIG. 4 is a flow chart illustrating how the battery charging system operates. As is shown, the user provides instructions or gives a command on the charging target at step 30, including the expected charge level and duration. The controller unit, after receiving the requirements through the interface, evaluates the feasibility of fulfilling the task at step 32 and makes a feasibility determination at 34. If it will be unable to meet objective expectations, it will respond by requesting the user to reset the objective, in which case the user must enter additional or different parameters. Otherwise the controller unit will generate the control command at 36, asking the charger unit to produce current pulses with specified amplitude and width. The charging unit initiates these commands at 38 and applies charge to the battery. At the next time instant, the overall situation will be assessed at 40, and the objective checked. If further charging is needed as determined at step 42, the controller unit will repeat the process again. Otherwise charging ends at step 44.

III. Method of Calculating and Applying Battery Charge

Figure 5:
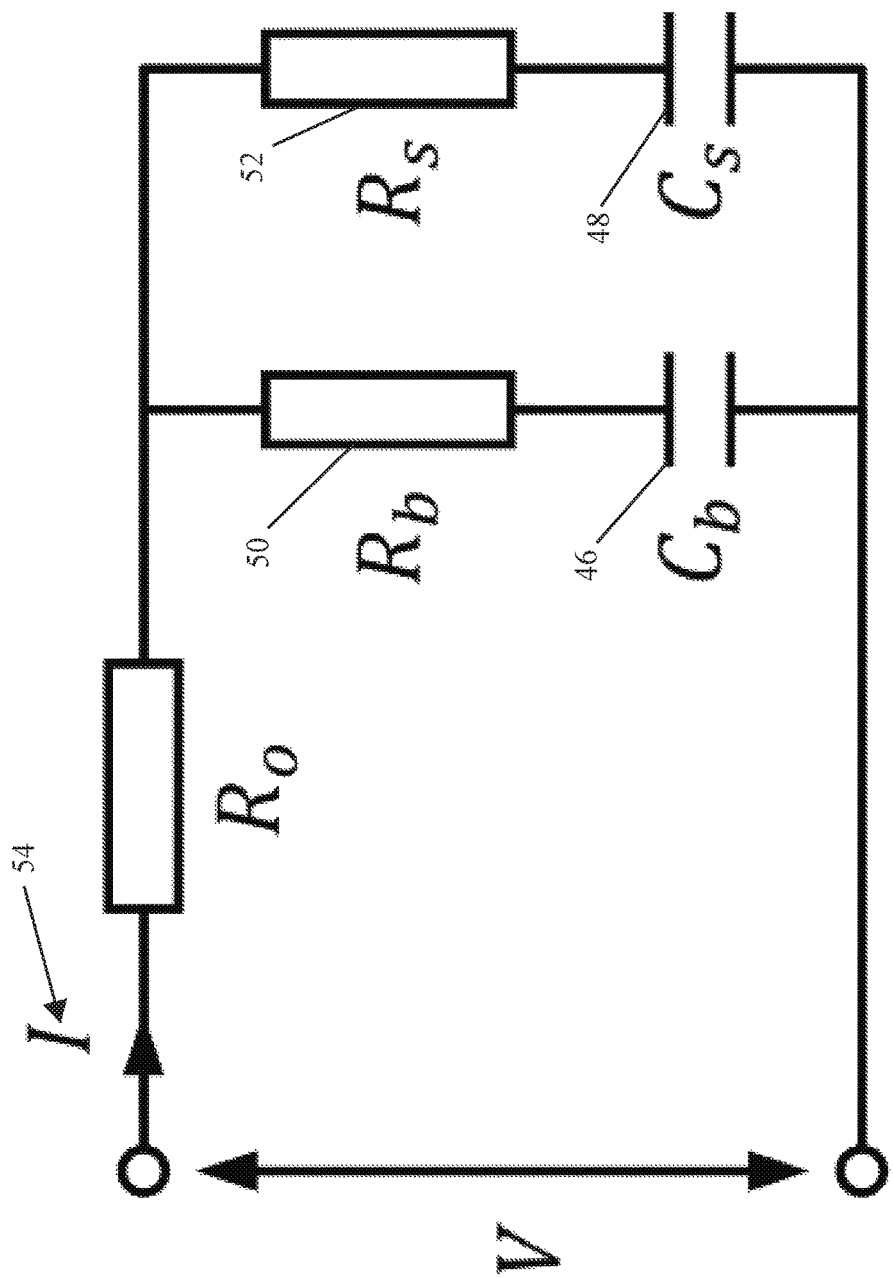
FIG. 5 is a diagram of an embodiment of the present invention based on an equivalent circuit.

We consider a general battery system described by a model shown in FIG. 5. The bulk capacitor $C_b$ 46 represents the battery's capability to store energy, and the capacitor $C_s$ 48 accounts for the surface effects, where $C_b \gg C_s$. The associated resistances are $R_b$ 50 and $R_s$ 52, respectively, with $R_b \gg R_s$. Let $Q_b$ and $Q_s$ be the charge stored by $C_b$ and $C_s$, respectively, and define them as the system states. When a positive current I(t) 54 is applied for charging, both $Q_b$ and $Q_s$ will grow, and the terminal voltage will change accordingly. The mathematical model is given by:

$$\begin{cases} \begin{bmatrix} \dot{Q}_b(t) \\ \dot{Q}_s(t) \end{bmatrix} = \begin{bmatrix} -\dfrac{1}{C_b(R_b+R_s)} & \dfrac{1}{C_s(R_b+R_s)} \\ \dfrac{1}{C_b(R_b+R_s)} & -\dfrac{1}{C_s(R_b+R_s)} \end{bmatrix} \begin{bmatrix} Q_b(t) \\ Q_s(t) \end{bmatrix} + \begin{bmatrix} \dfrac{R_s}{R_b+R_s} \\ \dfrac{R_b}{R_b+R_s} \end{bmatrix} I(t), \\ V(t) = \begin{bmatrix} \dfrac{R_s}{C_b(R_b+R_s)} & \dfrac{R_b}{C_s(R_b+R_s)} \end{bmatrix} \begin{bmatrix} Q_b(t) \\ Q_s(t) \end{bmatrix} + \left(R_0 + \dfrac{R_b R_s}{R_b+R_s}\right) I(t). \end{cases}$$

For the above model, let $Q_j$ and with $\overline{Q}_j$ with j=b, s denote the unusable and the maximum charge, respectively. Then the overall state-of-charge can be expressed as:

$$SoC = \frac{Q_b - \underline{Q}_b + Q_s - \underline{Q}_s}{\overline{Q}_b - \underline{Q}_b + \overline{Q}_s - \underline{Q}_s}. \tag{2}$$

The model in (1) above can be written in a compact form. Letting $x=[Q_b\ Q_s]^T$, u=I and y=V, the continuous-time model take the following standard form:

$$\begin{cases} \dot{x}(t) = A_c x(t) + B_c u(t), \\ y(t) = C_c x(t) + D_c u(t), \end{cases} \tag{3}$$

where $A_c$, $B_c$, $C_c$, and $D_c$ can be determined from the context. If discretized the model with a sampling period of $T_s$, discrete-time model take the following standard form:

$$\begin{cases} x_{k+1} = A_d x_k + B_d u_k, \\ y_k = C_d x_k + D_d u_k, \end{cases} \tag{4}$$

where $A_d$, $B_d$, $C_d$ and $D_d$ can be determined by the continuous-discrete conversion formulae.

A charging scenario that frequently arises is: according to the next drive need, a user will inform the charging management system of his/her objective in terms of target SoC and charging duration. This can occur for overnight parking at home, several-hour parking at the workplace, or when a drive to some place is needed in just half an hour. From the perspective of control design, the considered charging task can be formulated as an optimal control problem, which minimizes cost function commensurate with the harm to health and subject to the user's goal. With the model in (1), the following problem of tracking via linear quadratic control with fixed terminal state is of interest:

$$\min_{u_0, u_1, \ldots, u_N} \frac{1}{2} x_N^T S_N x_N + \frac{1}{2} \sum_{k=0}^{N-1} (x_k^T G^T Q_k G x_k + u_k^T R u_k), \quad (5)$$

subject to:

$$x_{k+1} = A_d x_k + B_d u_k,$$

$$x_N = \bar{x},$$

where $S_N \geq 0$, $Q_k \geq 0$ and $R > 0$ and $$G = \left[ \frac{1}{C_b} \quad -\frac{1}{C_s} \right].$$

In Formula 5 above, $Gx_k$ is the voltage difference between $C_b$ and $C_s$. The quadratic cost function, defined over the user-specified time range $[0, NT_s]$, intends to constrain the voltage difference and magnitude of the charging current. The minimization is subject to the state equation and the fixed terminal state $\bar{x}$, where $\bar{x}$ depends on the user's target SoC. In the final state, the battery should be at the equilibrium point with $V_b = V_s$. The weight coefficient $Q_k$ should be chosen in a way such that it increases over time, in order to reflect the truth that the stronger health protection is needed as the SoC builds up. A closed-form solution for (5) can be developed, which will lead to the following state-feedback-based charging method:

$$K_k = (B_d^T S_{N} B_d + R)^{-1} B_d^T S_{k+1} A_d, \quad (6\text{-}1)$$

$$S_k = A_d^T S_{k+1} (A_d - B_d K_k) + Q_k, \quad (6\text{-}2)$$

$$T_k = (A_d - B_d K_k)^T T_{k+1}, T_N = I, \quad (6\text{-}3)$$

$$P_k = P_{k+1} - T_{k+1}^T B_d^T (B_d^T S_{k+1} B_d + R)^{-1} B_d^T V_{k+1}, P_N = 0, \quad (6\text{-}4)$$

$$K_k^u = (B_d^T S_{k+1} B_d + R)^{-1} B_d^T, \quad (6\text{-}5)$$

$$u_k = -(K_k - K_k^u T_{k+1} P_k^{-1} T_k^T) x_k - K_k^u T_{k+1} P_k^{-1} \bar{x}. \quad (6\text{-}6)$$

For user-involved charging, it will be beneficial if a desired path is generated in advance on the basis of user-specified objectives for the charging process to follow. In this case, the path can serve as the references for the controller to track. The path generation can be conducted with prior experience or knowledge of the battery electrochemistries and present conditions, which, in turn, will enhance the health awareness through charging. Suppose that the user describes the target SoC and duration for charging, which is translated into the final state $\bar{x}$. Then a reference trajectory $r_k$ for $k = 0, 1, \ldots, N$ is generated with $r_N = \bar{x}$. The linear quadratic state feedback tracking for charging can be considered as:

$$\min_{u_0, u_1, \ldots, u_N} \frac{1}{2} (x_N - r_N)^T S_N (x_N - r_N) + \quad (7)$$

$$\frac{1}{2} \sum_{k=0}^{N-1} [(x_k - r_k)^T Q(x_k - r_k) + u_k^T R u_k],$$

subject to: $x_{k+1} = A_d x_k + B_d u_k$, where $S_N \geq 0$, $Q_k \geq 0$ and $R > 0$. The optimal charging methods obtained by solving the above problem can be expressed as:

$$K_k = (B_d^T S_{k+1} B_d + R)^{-1} B^T S_{k+1} A_d, \quad (8\text{-}1)$$

$$K_k^s = (B_d^T S_{k+1} B_d + R)^{-1} B^T, \quad (8\text{-}2)$$

$$S_k = A_d^T S_{k+1} (A_d - B_d K_k) + Q, \quad (8\text{-}3)$$

$$s_k = (A_d - B_d K_k)^T s_{k+1} + Q r_k, s_N = S_N r_N, \quad (8\text{-}4)$$

$$u_k = -K_k x_k + K_k^s s_{k+1}. \quad (8\text{-}5)$$

In the above optimal charging solution (8-1)-(8-5), $S_k$ will approach a steady state, $\bar{S}$, when the charging time is sufficiently long. Here, $\bar{S}$ is a unique stabilizing solution of the discrete algebraic Riccati equation:

$$X = A_d^T X A_d - A_d^T X B_d (B_d^T X B_d + R)^{-1} B_d^T X A_d + Q. \quad (9)$$

Then $K_k$ and $K_k^s$ ill approach their respective steady states, $\bar{K} = (B_d^T \bar{S} B_d + R)^{-1} B_d^T \bar{S} A_d$ and $\bar{K}_s = (B_d^T \bar{S} B_d + R)^{-1} B_d^T$. The optimal charging control in (8-5) is then given by $$u_k = -\bar{K} x_k + \bar{K}_s s_{k+1}. \quad (10)$$

The notion contained in the development of (6-1)-(6-6) and (8-1)-(8-5) can be extended to build a charging method via constrained optimal control executed in receding horizon. At time instant k, the best current profile over the window $[k, k+N_w]$, where $N_w$ is the size of the receding window, is obtained by minimizing an objective function that compares the predicted states and reference trajectories:

$$\min_{u_k, u_{k+1}, \ldots, u_{k+N_W}} \sum_{i=k}^{k+N_W} J(x_i, r_i, u_{i-1}), \quad (11)$$

subject to: $x_{i+1} = A_d x_i + B_d u_i$,
$0 \leq u_i \leq \bar{u}$, $\underline{\mu} \leq G x_i \leq \bar{\mu}$, where J is the cost function, r is the desired trajectory, $\bar{u}$ is the allowed maximum current magnitude, and $\underline{\mu} \leq G x_i \leq \bar{\mu}$ is the health constraint to be enforced.

Leveraging the model (4), a rule-based pulse charging based method is as follows:

$$u_k = \begin{cases} M & \text{if } \underline{\mu} \leq G x_k \leq \bar{\mu}, \\ 0 & \text{otherwise.} \end{cases} \quad (12)$$

This method in (12) indicates that if the health constraint $\underline{\mu} \leq G x_k \leq \bar{\mu}$ is satisfied at time instant k, then a current of magnitude M can be applied to charging, and if otherwise, a zero current is used.

An optimal pulse charging can be further developed. Consider the model in (3) and that a pulse signal is applied at every time instant to charge the battery. A pulse is given by:

$$u(t) = \begin{cases} M & \text{if } kT_s \leq u(t) \leq kT_s + r, \\ 0 & \text{otherwise,} \end{cases} \quad (13)$$

where M is the magnitude and r is the width. It is needed to design the optimal magnitude and width of the pulse for maximum charging with the best battery health protection. This can be accomplished by formulating different optimization problems. One way to achieve this is to minimize the following cost function:

$$\min_{M,r} x^T(kT+r)G^T Q_k G^T x(kT+r) - \quad (14)$$

$$[x(kT+r)-x(kT)]^T F^T R_k F[x(kT+r)-x(kT)],$$

where F=[1 1] and:

$$x(kT+r)=e^{Ar}x(kT)+\int_0^r e^{A\tau}d\tau \cdot BM. \quad (15)$$

The first term of (14) accounts for the cost caused by the voltage difference, and the second term is associated with the electricity energy pumped into the battery by the pulse. Numerical solutions can be developed for (13) to decide the best M and r. A schematic illustration of the charging profile as a result of (13) is shown in FIG. 3.

The methods given in (6-1)-(6-6), (8-1)-(8-5), (11), (12) and (14) are state-based. Since the state $x_k$ is not measurable directly, a straightforward solution to achieve this would be to replace $x_k$ by its prediction $\hat{x}_k$. Here, $\hat{x}_k$ can be obtained by state observers and estimators, e.g., the Kalman filter.

The above methods can be applied to other battery models, including those based on the electrochemical principles and other equivalent circuits.

It is to be understood that while certain embodiments and/or aspects of the invention have been shown and described, the invention is not limited thereto and encompasses various other embodiments and aspects.

The invention claimed is:

1. A battery charging system comprising:
an external power source;
a battery;
a charging unit electrically connected to said external power source and configured to apply current to said battery, thereby charging said battery;
a battery management unit configured to estimate a state-of-charge factor of said battery, a state-of-health factor of said battery, and is further configured to monitor a capacity fade and an internal resistance increases of said battery based upon voltage, current, and temperature data provided to said battery management unit;
a data storage unit configured to receive and store historical data of said battery;
a controller configured to operate said charging unit and said battery management unit;
an interface configured to receive charge duration and state-of-charge instructions from an external source; and
wherein said charging unit is configured to determine an optimal charging current which is calculated through a linear quadratic tracking formula determined by:

$$K_k=(B_d^T S_{k+1} B_d+R)^{-1} B^T S_{k+1} A_d,$$

$$K_k^s=(B_d^T S_{k+1} B_d+R)^{-1} B_d^T,$$

$$S_k=A_d^T S_{k+1}(A_d-B_d K_k)+Q,$$

$$s_k=(A_d-B_d K_k)^T s_{k+1}+Qr_k, s_N=S_N r_N,$$

$$u_k=-K_k x_k + K_k^s s_{k+1}.$$

2. The battery charging system of claim 1, wherein the charging unit generates current with amplitude being dynamically controlled and regulated by said controller unit.

3. The battery charging system of claim 1, wherein the current comprises pulses having controlled width and amplitude.

4. The charging system of claim 1, wherein said controller unit derives control commands from data received from a plurality of data sources selected from a list comprising: specified charge objectives; state-of-charge factor; state-of-health factor; temperature; voltage; current; charge capacity; and internal resistance.

5. The charging system of claim 1, wherein said controller is configured to provide rule-based control commands.

6. The charging system of claim 1, wherein said controller is configured to provide optimization-based control commands.

7. The charging system of claim 1, wherein said battery is selected from a list comprising: a lithium-ion battery; a nickel metal hydride battery; a lead-acid battery; and a sodium-ion battery.

8. A method of charging a battery, the method comprising the steps:
receiving, at a controller, an external command comprising target charging capacity instructions and charging duration instructions for a battery;
analyzing, with said controller, said external command;
computing, with said controller, an optimal charging current for a charging time interval;
applying said optimal charging current to said battery with a charging unit connected to an electrical power source and controlled by said controller for said charging time interval; and
wherein said optimal charging current is calculated through a linear quadratic tracking formula determined by:

$$K_k=(B_d^T S_{k+1} B_d+R)^{-1} B^T S_{k+1} A_d,$$

$$K_k^s=(B_d^T S_{k+1} B_d+R)^{-1} B_d^T,$$

$$S_k=A_d^T S_{k+1}(A_d-B_d K_k)+Q,$$

$$s_k=(A_d-B_d K_k)^T s_{k+1}+Qr_k, s_N=S_N r_N,$$

$$u_k=-K_k x_k + K_k^s s_{k+1}.$$

9. The method of claim 8, further comprising the steps:
receiving, at said controller, external instructions regarding a charging objective;
measuring, with said controller, battery status conditions; and
computing, with said controller, said optimal charging current based upon said battery status conditions and said external instructions.

10. The method of claim 8, wherein said optimal charging current is calculated through a linear quadratic control formula determined by:

$$K_k=(B_d^T S_N B_d+R)^{-1} B_d^T S_{k+1} A_d,$$

$$S_k=A_d^T S_{k+1}(A_d-B_d K_k)+Q_k,$$

$$T_k=(A_d-B_d K_k)^T T_{k+1}, T_N=I,$$

$$P_k=P_{k+1}-T_{k+1}^T B_d^T (B_d^T S_{k+1} B_d+R)^{-1} B_d^T T_{k+1}, P_N=0,$$

$$K_k^u = (B_d^T S_{k+1} B_d + R)^{-1} B_d^T,$$

$$u_k = -(K_k - K_k^u T_{k+1} P_k^{-1} T_k^T) x_k - K_k^u T_{k+1} P_k^{-1} \bar{x}.$$

11. The method of claim 8, wherein $K_k$ and $K_k^s$ indicate gains which can achieve steady state, and wherein the steady-state gains can be computed offline and applied to charging, yielding a charging method computed by:

$$\bar{S} = A_d^T \bar{S} A_d - A_d^T \bar{S} B_d (B_d^T \bar{S} B_d + R)^{-1} B_d^T \bar{S} A_d + Q,$$

$$\bar{K} = (B_d^T \bar{S} B_d + R)^{-1} B_d^T \bar{S} A_d,$$

$$\bar{K}^s = (B_d^T \bar{S} B_d + R)^{-1} B_d^T,$$

$$s_k = (A_d - B_d \bar{K})^T s_{k+1} + Q r_k, s_N = S_N r_N,$$

$$u_k = -\bar{K} x_k + \bar{K}^s s_{k+1}.$$

12. The method of claim 8, wherein the charging is performed by constrained optimal control over a receding horizon, and said optimal charging current is computed by solving the constrained optimization:

$$\min_{u_k, u_{k+1}, \ldots, u_{k+N_W}} \sum_{i=k}^{k+N_W} J(x_i, r_i, u_{i-1}),$$

subject to: $x_{i+1} = A_d x_i + B_d u_i,$
$0 \le u_i \le \bar{u}, \underline{\mu} \le G x_i \le \bar{\mu}.$

13. The method of claim 8, wherein a pulse is generated at a determined time interval determined by:

$$u_k = \begin{cases} M & \text{if } \underline{\mu} \le G x_k \le \bar{\mu}, \\ 0 & \text{otherwise.} \end{cases}$$

14. The method of claim 8, wherein a pulse is generated having an optimal magnitude and width determined by:

$$\min_{M,r} x^T(kT+r) G^T Q_k G^T x(kT+r) - [x(kT+r) - x(kT)]^T F - T R_k F[x(kT+r) - (kT)].$$

15. The method of claim 8 wherein said battery is selected from a list comprising: a lithium-ion battery; a nickel metal hydride battery; a lead-acid battery; and a sodium-ion battery.

\* \* \* \* \*